United States Patent [19]
Schmidt

[11] Patent Number: 5,136,953
[45] Date of Patent: Aug. 11, 1992

[54] TAIL GATE TABLE

[76] Inventor: Donald R. Schmidt, 16319 Whitehead Dr., Linden, Mich. 48451

[21] Appl. No.: 502,874

[22] Filed: Apr. 2, 1990

[51] Int. Cl.⁵ .................................... A47B 23/00
[52] U.S. Cl. ................................ 108/44; 108/49
[58] Field of Search ............... 108/44, 46, 47, 49; 224/152, 42.03 A, 42.03 R

[56] References Cited

U.S. PATENT DOCUMENTS

| | | | |
|---|---|---|---|
| 355,911 | 1/1887 | Bartow, Jr. | 108/49 X |
| 1,232,757 | 7/1917 | Berkey | 108/49 X |
| 1,301,953 | 4/1919 | Lewis | 108/49 |
| 1,588,914 | 6/1926 | Smith | 108/49 X |
| 2,645,393 | 7/1953 | Campbell | 224/42.03 A |
| 2,710,051 | 6/1955 | Greenberg | 108/49 X |
| 2,721,777 | 10/1955 | Willis | 108/44 |
| 3,245,716 | 4/1966 | Danner | 108/47 X |
| 3,295,473 | 1/1967 | Wentworth | 108/44 X |
| 4,203,373 | 5/1980 | Conti | 108/152 |

FOREIGN PATENT DOCUMENTS 193998  3/1923  United Kingdom ................ 108/44

Primary Examiner—José V. Chen
Attorney, Agent, or Firm—John J. Swartz

[57] ABSTRACT

A tailgate table for mounting on the rear upstanding wall of an automobile truck enclosure including: a table top, and mount mechanism depending from the table top to receive the rear wall for cantileverly mounting the table top on the upstanding rear wall.

1 Claim, 1 Drawing Sheet

TAIL GATE TABLE

BACKGROUND OF THE INVENTION

1. Field of the Invention

This invention relates to a table and more particularly to a table which is mounted on an automobile trunk enclosure.

2. Description of the Prior Art

An activity which has grown in popularity over the past several years, includes the gathering of fans at their automobiles for eating and dining prior to certain athletic events. Such picnics are particularly common at football games and have become frequently known as "tail-gate" parties. Since the tail gate parties frequently occur in parking lots, dining tables are not normally readily accessible. Thus, people store their food and beverages in their trunks and "eat out of their trunks." Others open foldable tables, which are stored in their automobile trunk, and set food and drink on the tables which are positioned adjacent to the rear of the automobile.

Such picnics may also be enjoyed in various remote areas, such as a woods, picnic grounds, amusement parks, etc.

DESCRIPTION OF THE PRIOR ART

The apparatus constructed according to the present invention comprises a table which can be mounted on the rear wall of a trunk enclosure. U.S. Pat. No. 4,494,465 issued to Charles M. Fick, Jr., on Jan. 22, 1985, discloses a prior table for mounting on an automobile trunk, however, it incorporates a rather complicated leg arrangement for supporting the table on the ground. It frequently occurs that, at the areas where "tail-gaters" eat and dine, the ground surface is uneven, soft and otherwise not readily adaptable for mounting a table leg. U.S. Pat. No. 3,011,847 issued to R.C. Rader on Dec. 5, 1961, disclose a trunk mounted automobile table which necessitates modification of the automobile by mounting hooks in the bott.om wall of the trunk enclosure. Such hooks are relatively complicated to install, unsightly and interfere with luggage storage. The apparatus constructed according to the present invention contemplates a table which is cantileverly mounted on the trunk so that no vertical support legs are necessary for mounting in the trunk or for supporting the table on the ground.

Other prior art U.S. patents known to applicant are as follows:

| U.S. Pat. No. | PATENTEE | ISSUE DATE |
| --- | --- | --- |
| 2,451,275 | J. M. Cercownay | Oct. 12, 1948 |
| 2,718,445 | E. A. Wilson | Sep. 20, 1955 |
| 2,721,777 | J. L. Willis | Oct. 25, 1955 |
| 2,833,608 | J. C. Tobias | May 6, 1958 |
| 3,709,159 | Oglesby, Jr. | Jan. 9, 1973 |
| 3,896,742 | Ferraro | Jul. 29, 1975 |
| 4,418,626 | Semien | Dec. 6, 1983 |
| 4,452,151 | Jarrard | Jun. 5, 1984 |

It is an object of the present invention to provide a new and novel tail gate table.

It is another object of the present invention to provide a new and novel table for mounting on a trunk enclosure of an automobile.

It is a further object of the present invention to provide a new and novel table for mounting on an upstanding rear wall of a trunk enclosure.

It is a further object of the present invention to provide the new and novel tail gate table which is cantileverly mounted on a rear wall of an automobile trunk enclosure.

A further object of the present invention is to provide a new and novel tail gate table which is cantileverly mounted on a rear wall of a trunk enclosure and which can be longitudinally adjusted to any selected one of a plurality of different front-to-rear spaced positions.

Other objects and advantages of the present invention will become apparent to those of ordinary skill in the art as the description thereof proceeds.

SUMMARY OF THE INVENTION

A tail gate table for mounting on an automobile trunk enclosure having an upstanding rear wall comprising a table top and cantilever mount mechanism depending from the table top and adapted to receive the rear wall for cantileverly mounting the table top on the upstanding rear wall.

BRIEF DESCRIPTION OF THE DRAWINGS

The invention may be more readily understood by referring to the drawings, in which.

DESCRIPTION OF PREFERRED EMBODIMENT

Figure 1:
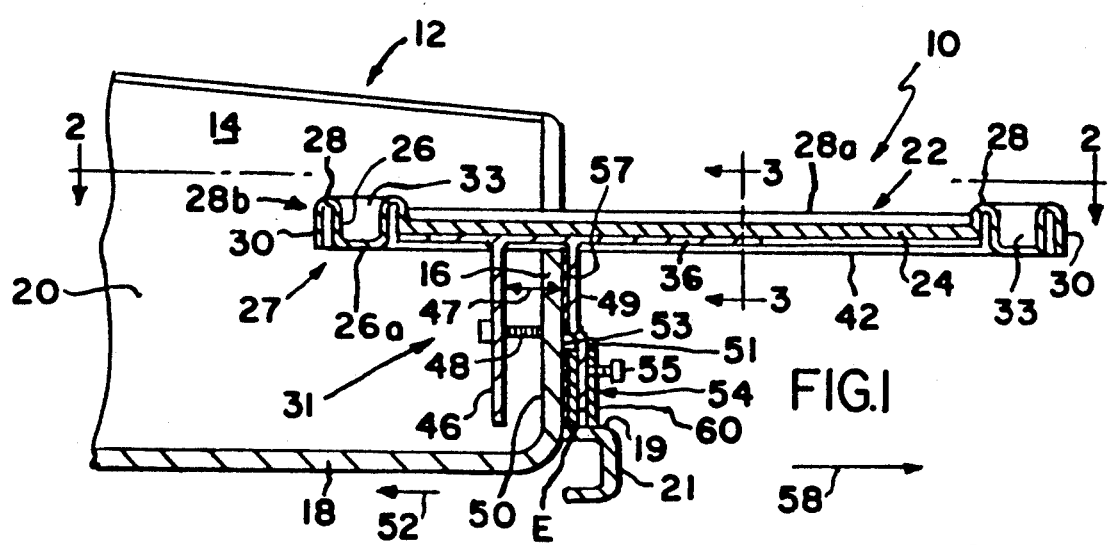
FIG. 1 a side sectional view, taken along the line 1—1 of FIG. 2, of a table, constructed according to the present invention, mounted on an upstanding rear wall of an open automobile trunk.
Figure 2:
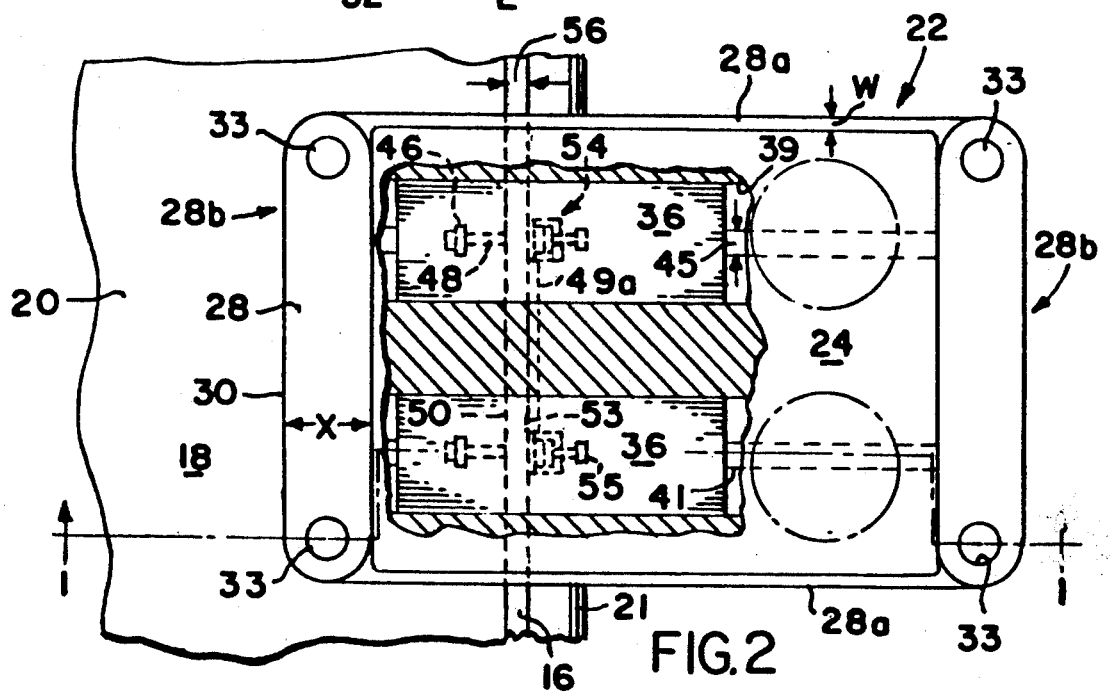
FIG. 2 is a top plan view of the table constructed according to the present invention, taken along the line 2—2 of FIG. 1, parts of the table top being broken away to better illustrate a portion underlying mounting structure.
Figure 3:
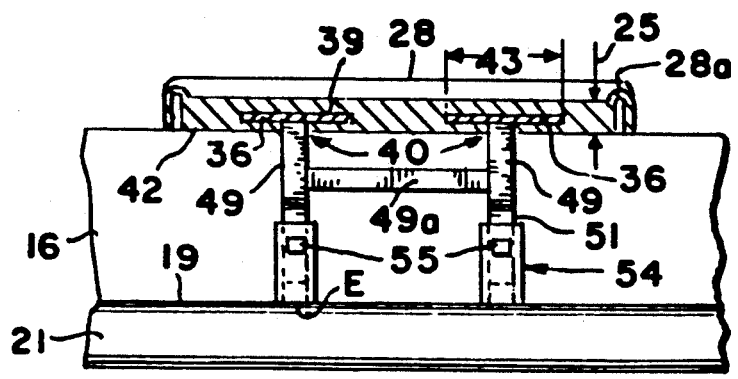
FIG. 3 is a rear end sectional view thereof, taken along the line 3—3 of FIG. 1.

A tail gate table, generally designated 10, constructed according to the present invention, is particularly adapted for use with an automobile (not shown) having an automobile trunk enclosure, generally designated 12, including opposed side walls 14 spanned by a rear upstanding wall 16 and a bottom wall 18. A top trunk deck lid (not shown) which includes a depending rear wall portion that complements rear wall portion 16, completes the trunk enclosure as usual. The automobile also includes a rear bumper 21 having a top wall 19 as usual. The trunk enclosure 12 defines an internal compartment 20 in which the table 10, when not in use, as well as luggage, food, etc. can be stored.

The table 10 includes a table top, generally designated 22, including a generally planar panel 24, having a predetermined thickness 25, and an integral perimetrically extending retaining flange, generally designated 27. The flange 27 is illustrated as having an inverted U-shaped cross section, and includes an annular inner side wall 26 integral with a bottom wall 26a, an annular integral horizontal, parallel, top wall, generally designated 28, and a downwardly extending, integral annular outer wall 30. The top wall 28 includes a pair of generally parallel top, wall side portions 28a of a predetermined width W and a pair of generally parallel, horizontal, end wall portions 28b of a greater predetermined width X. A plurality of recessed portions or cup receiving wells 33 are provided in the end top wall flange portions 28b for receiving drinking containers (not shown).

The table top 22 is mounted on the upstanding trunk wall 16 via a cantilever mount, generally designated 31. The cantilever mount 31 includes a pair of longitudinally extending slides or rails 36 slidingly, snuggly, frictionally received by a pair of laterally spaced, downwardly opening T-shaped slots, generally designated 40, provided in the bottom wall 42 of the panel 24. A brace member 49a spans the legs 49 to improve rigidity of the table. The slots 40 each have a main slot portion 39 of a predetermined width 43 and a reduced lower neck 41 of a lesser width 45 which communicate with one of the main slot portions 39 along the length of the bottom wall 42.

The cantilever mount 31 includes a pair of longitudinally spaced front and rear mount legs 46, 49 respectively, coupled to the underside of each of the slides 36. The front to rear distance 47 between the depending mount legs 46, 49 in each pair is sufficient to freely receive therebetween a trunk wall 16 of various thicknesses 56.

To insure that the table 10 is secure when the trunk wall thickness 56 is relatively thin, a threaded clamping rod 48 is threadedly mounted in the front mount leg 46 for engaging the inside surface 50 of the upstanding trunk wall 16 to urge the rear mount leg 49 forwardly, in the direction of the arrow 52, into tight clamping engagement with the outer surface 53 of the trunk wall 16. The inner surface 55 of the outer mount leg 49 may be lined with a layer 57 of fabric, felt or other material which will not mar the outer trunk surface 53.

It should be noted that the rearward or outermost leg 49 of each pair of legs is of sufficient vertical length that the lower terminal edge E thereof bears on the upper surface 19 of the bumper 21.

The leg 49 includes an upper rod portion 51 and a lower hollow cylindrical leg 54 telescopingly received thereon for vertical adjustment. A thumb screw 55 is threaded through the sidewall 60 of the cylindrical leg portion 53 to selectively secure the leg portions 51, 53 together in any selected one of a plurality of different vertically adjusted positions.

The rails 36 are snuggly, slidingly, frictionally mounted in the slots 40 such that the table 10 can be moved forwardly, in the direction of the arrow 52, or rearwardly in a direction of the arrow 54 to any selected one of a plurality of different longitudinally spaced positions relative to the rear wall 16 and the cantilever mount means 31. Because of the tight frictional relation between the rails 36 and the slots 40, the table 10 will tend to remain stationary in any of the longitudinally adjusted positions.

OPERATION

The table 10 can typically be stored in the trunk enclosure 12. When it is desired to use the table 10, the clamping screw 48 is turned out of the inner depending leg 46 and the legs 46 and 49 are disposed on opposite sides of the rear trunk wall 16. The thumb screw 59 is turned out of the bottom cylindrical leg portion 58 which is vertically adjusted relative to the upper rod portion 51 so that the lower terminal edge E thereof is supported by the bumper top wall 19, as illustrated in FIG. 1. The screw 59 is then tightened. The screw 48 is then turned inwardly to the position illustrated in FIG. 1 to engage the inner surface 55 of wall 16 to force the other leg 49 forwardly into clamping engagement with outer surface 53 of the trunk wall 16. The table top 22 can be moved relative to the trunk enclosure 12 by sliding the panel 24 relative to the guide rails 36.

When the tail gate party is finished, the users need merely unclamp the screws 48 and return the table 10 to the trunk enclosure.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A tail gate table for mounting on an automobile trunk enclosure having an upstanding rear wall, said table comprising:

a table top including longitudinally spaced apart forward and rear ends;

cantilever mount means, depending from said table top and adapted to receive said rear wall, for cantileverly mounting said table top on said upstanding rear wall, means for detachably securing said cantilever mount means to said rear wall comprising means for reacting between said cantilever mount means and said rear wall;

said cantilever mount means comprising a pair of legs depending from said table top and said detachable securing means comprises reacting means reacting between one of said legs and said rear wall to detachably clamp the other of said legs to said rear wall;

said reacting means comprising screw means threadedly received by said one leg for longitudinal movement in one direction to force the other leg in an opposite direction toward said rear wall;

means adjustably mounting said table top on said cantilever mount means for longitudinal movement relative thereto between any selected one of a plurality of different longitudinally spaced positions including a downwardly opening longitudinally extending T-shaped slot in the underside of said table top and longitudinally extending rail means on said cantilever mount means slidingly received by said longitudinally extending slot;

said rearwardmost one of said legs includes a first vertical leg section and a second vertical leg section telescopingly received on said first section for movement relative thereto between any one of a plurality of different vertically spaced positions, and means for detachably clamping said leg sections in any selected one of said vertically spaced positions.

* * * * *